April 11, 1933. G. A. RIME 1,903,534
WIND DRIVEN ELECTRIC POWER PLANT
Filed July 15, 1930 2 Sheets-Sheet 1
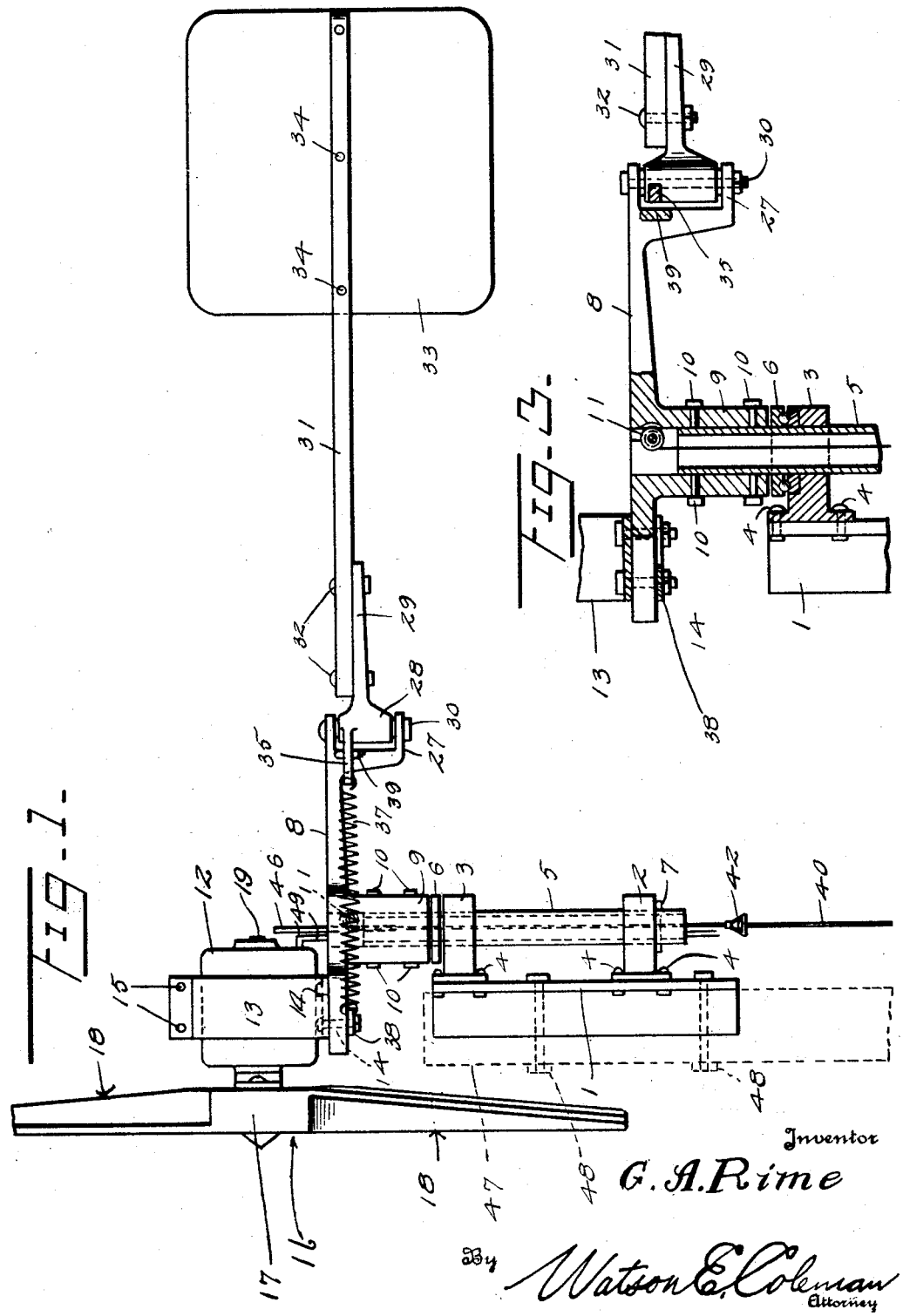
Inventor
G. A. Rime
By Watson E. Coleman
Attorney April 11, 1933.   G. A. RIME   1,903,534
WIND DRIVEN ELECTRIC POWER PLANT
Filed July 15, 1930   2 Sheets-Sheet 2
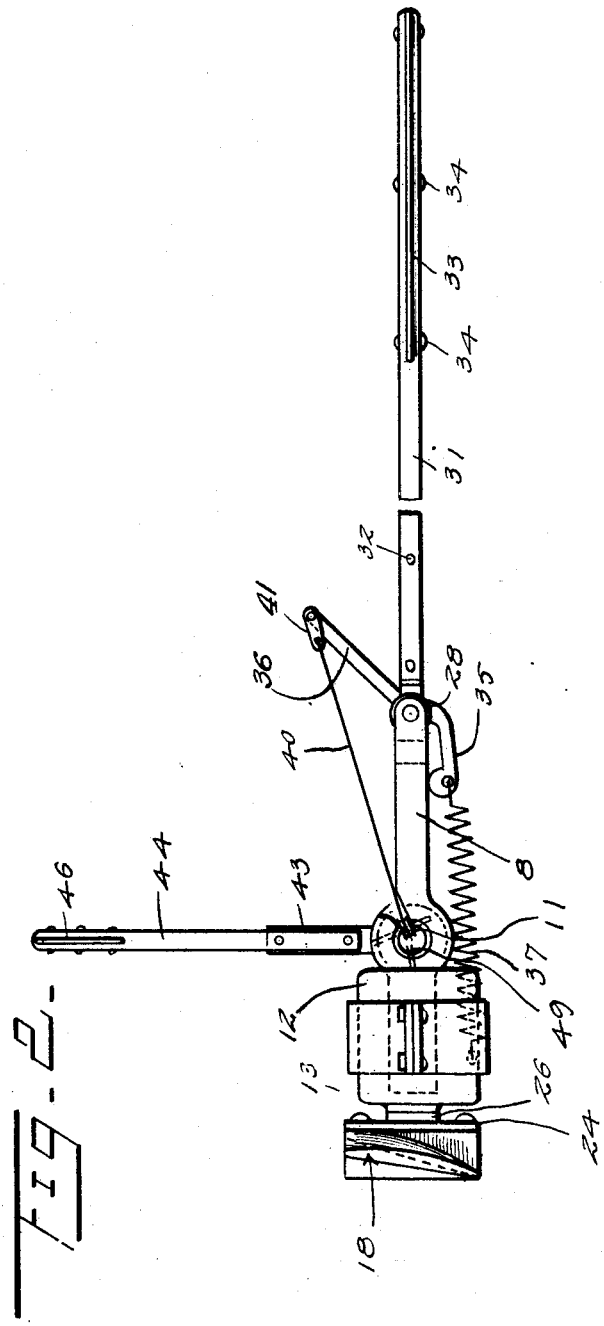
Inventor
G. A. Rime
By Watson E. Coleman
Attorney Patented Apr. 11, 1933

1,903,534

UNITED STATES PATENT OFFICE

GILBERT A. RIME, OF NORTHWOOD, NORTH DAKOTA

WIND DRIVEN ELECTRIC POWER PLANT

Application filed July 15, 1930. Serial No. 468,121.

This invention relates to wind driven electric power plants, and has for one of its objects to improve and simplify the general construction of plants of this character and to provide one which shall embody a generator, and a propeller fixed directly to the armature shaft of the generator and of such construction as to permit the operation of the armature at current generating speed by winds which, due to their low velocity have heretofore been found unsuitable for this purpose and also by high velocity winds.

The invention has for a further object to provide a power plant of the character stated which shall embody a head adapted to have the generator secured thereto, and means for rotatably supporting the head and adapted to be readily secured to a tower which may be of any well known or appropriate construction.

The invention has for a further object to provide a power plant of the character stated which shall embody a standard adapted to be secured to a tower of any well known or appropriate construction, bearings fixed to the standard and a vertically arranged hollow shaft carrying the head and rotatably supported by the bearings.

The invention has for a further object to provide a power plant of the character stated which shall embody a vane pivoted to the head, a spring holding the vane in a plane at right angles to the path of rotation of the propeller to the end that the vane will maintain the propeller in the wind, and a second vane fixed to the head and smaller than and arranged at right angles to said first vane and adapted when the pressure of the wind against it is greater than the power of the spring to swing the head in a direction to arrange the propeller and said first vane in substantially parallel relation to the end that the propeller will be moved out of a wind of such velocity as to be apt to cause damage thereto.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of the power plant;

Figure 2 is a top plan view of the power plant;

Figure 3 is a view partly in side elevation and partly in vertical section of the head of the power plant and portion of the head supporting means.

The power plant comprises a standard 1, lower and upper bearings 2 and 3, respectively, secured by bolts 4 to the standard and extending horizontally therefrom, and a vertical shaft 5 of hollow formation and journaled in the bearings. The bearings 2 and 3 are of anti-friction type, and the shaft 5 is held against endwise displacement therefrom by a collar 6 which is secured to the shaft and rests upon the bearing 3 and a bolt 7 which passes through the shaft at a point below the bearing 2.

A head 8 of elongated rectangular formation in plan and provided between its ends with a downwardly extending collar 9, is secured to the upper end of the shaft 5. The collar 9 embraces the upper end of the shaft 5, and is secured thereto by bolts 10. The collar 9 extends above the shaft 5, and journaled in the upper end thereof is a grooved pulley 11.

An electric generator 12 of any well known or appropriate construction, is mounted upon the head 8 with its axis arranged parallel to the head. The generator 12 is mounted upon the head 1 forwardly beyond the sleeve 9, and it is secured in place by a split band 13 which is secured centrally between its ends to the head by bolts 14. The band 13 is provided at its free ends with bolts 15 by means of which it is secured in tight clamping engagement with the generator 12.

A propeller 16 having a hub 17 and diametrically opposed blades 18, is fixedly secured to the armature shaft 19 of the generator 12. The propeller 16 turns to the right as viewed from the front.

A plate 24, which is secured by bolts 25 to the rear side of the hub 17, is provided with a collar 26 which receives the armature shaft 19 and is fixedly secured thereto.

The head 8 is provided at its rear end with a fork 27, and arranged in the fork is the knuckle 28 of a horizontal bracket arm 29. A bolt 30 passes through the fork 27 and knuckle 28 to permit the arm 29 to rotate about a vertical axis with respect to the head 8. A bar 31 extends rearwardly from the arm 29 and has its front end positioned upon the arm and secured thereto by bolts 32. The rear end portion of the arm 31 is slotted for the reception of a vane 33 which extends above and below the arm and is secured in place by bolts 34. Lever arms 35 and 36 extend in opposite directions from the knuckle 28 and are arranged at right angles to the bracket arm 29. A coil spring 37 is secured at one end to the outer end of the bell crank 35 and is secured at its other end to the outer end of a bracket 38 which extends horizontally from the head 8 at a point forwardly beyond the sleeve 9 and is secured in place by the bolts 14. The spring 37 functions to normally maintain the vane 33 in a plane arranged at right angles to the path of rotation of the propeller 16. The movement of the vane 33 under the influence of the spring 37 is limited by a lug 39 extending horizontally from the fork 27 and the lever arm 35 which contacts with the lug when the vane 33 is in a plane at right angles to the path of rotation of the propeller 16.

When the vane is in this position it maintains the propeller in the wind. A cable 40 which passes through the hollow shaft 5 and over the direction pulley 11, has its upper end secured by a clamp 41 to the outer end of the lever arm 36, and provides means by which the vane 33 may be swung into a position parallel to the path of rotation of the propeller when it is desired to throw the propeller out of the wind. The cable 40 is made in sections, and the sections thereof are connected by a swivel 42.

A bracket arm 43 extends laterally from the transverse center of the head 1 and is fixedly secured thereto. A bar 44 is fixed at one end, by bolts 45 to the arm 43 and extends longitudinally from the arm and is provided in its rear end portion with a slot for the reception of a vane 46 which extends above and below the bar. The vane 46 is smaller than the vane 33 and occupies a plane parallel to the path of rotation of the propeller 16. When the pressure of the wind against the vane 46 is greater than the power of the spring 37, but less than the pressure of the wind against the vane 33, the head 1 is rotated with respect to the vane 33, with the result that the propeller 16 is carried out of the wind.

It should be apparent from the foregoing description, taken in connection with the accompanying drawings, that the power plant may be easily and quickly secured, through the medium of the standard 1 to a tower or other suitable support, such a support being indicated by dotted lines and designated 47, and the standard being adapted to be secured to the support through the medium of bolts 48.

The vane 33 normally holds the propeller 16 in the wind, and the propeller is of such construction as to permit the operation of the armature of the generator 12 by winds which, due to their low velocity, have heretofore been found unsuitable for this purpose and also by high velocity winds. The wires 49 leading from the generator are carried downwardly through the shaft 5, and may be connected to the storage battery of a radio receiving set or the like, the power plant being especially adapted to be used for the purpose of charging such batteries. When the wind is blowing at a rate which would be apt to cause damage to the power plant, the pressure of the wind against the vane 46 results in the propeller 16 being automatically carried out of the wind and when the pressure is reduced, the spring 37 returns the propeller into the wind. The cable 40 provides means through the medium of which the propeller may be manually moved out of the wind.

The power plant is simple, durable and highly efficient, it may be manufactured and sold at a comparatively low cost and it may be maintained in a highly efficient condition with comparatively little labor and cost.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

A power plant comprising a standard, a shaft rotatably supported in vertical position in said standard, a horizontally disposed head secured to the upper end of said shaft, a vane fixed to said head, a second vane pivoted to said head and disposed at right angles to the first vane, a pair of laterally extending arms secured to said second vane, a spring engaging one of said arms and said head, a split clamp upstanding from said head in substantial alinement with said second vane, a propeller, and means disposed in the clamp for rotatably supporting the propeller on the head, said clamp comprising a base portion, means for securing the base portion to the head, complementary clamping arms extending upwardly from the base portion and engaging about said latter means and terminating thereabove in vertical ears, and means for drawing the ears together to tighten the said latter means in the arms.

In testimony whereof I hereunto affix my signature.

GILBERT A. RIME.